United States Patent [19]

Garrett et al.

[11] 4,235,312

[45] Nov. 25, 1980

[54] BRAKE ACTUATOR ASSEMBLY

[75] Inventors: Wayne H. Garrett, Troy; Ted Zbikowski, Southfield, both of Mich.

[73] Assignee: Eaton Corporation, Cleveland, Ohio

[21] Appl. No.: 955,813

[22] Filed: Oct. 30, 1978

[51] Int. Cl.³ ...................... F16D 51/00; F16D 55/08
[52] U.S. Cl. ................................. 188/72.7; 188/343; 308/6 R
[58] Field of Search ................. 188/72.7, 343; 74/110; 308/6 R

[56] References Cited

U.S. PATENT DOCUMENTS 4,018,313  4/1977  Hart et al. .......................... 188/343

FOREIGN PATENT DOCUMENTS 2365979  4/1977  Fed. Rep. of Germany ........... 188/343

*Primary Examiner*—Douglas C. Butler
*Attorney, Agent, or Firm*—R. J. McCloskey; D. Wood

[57] ABSTRACT

A wedge type actuator assembly for a disc brake employing a roller bearing assembly interposed between the wedge member and the tappet and including a generally U-shaped cage member embracing the wedge member and having a plurality of transversely extending slots each journally receiving a roller bearing. The wedge member includes raised ribs on each end face which guide on the adjacent housing surfaces. The end portions of the cage member guide on the portions of the end faces of the wedge member between the raised rib and the wedge face and include steps which coact with steps defined by the raised ribs to restore relative indexing of the roller bearing assembly and wedge member in the event the indexing becomes disturbed.

9 Claims, 5 Drawing Figures

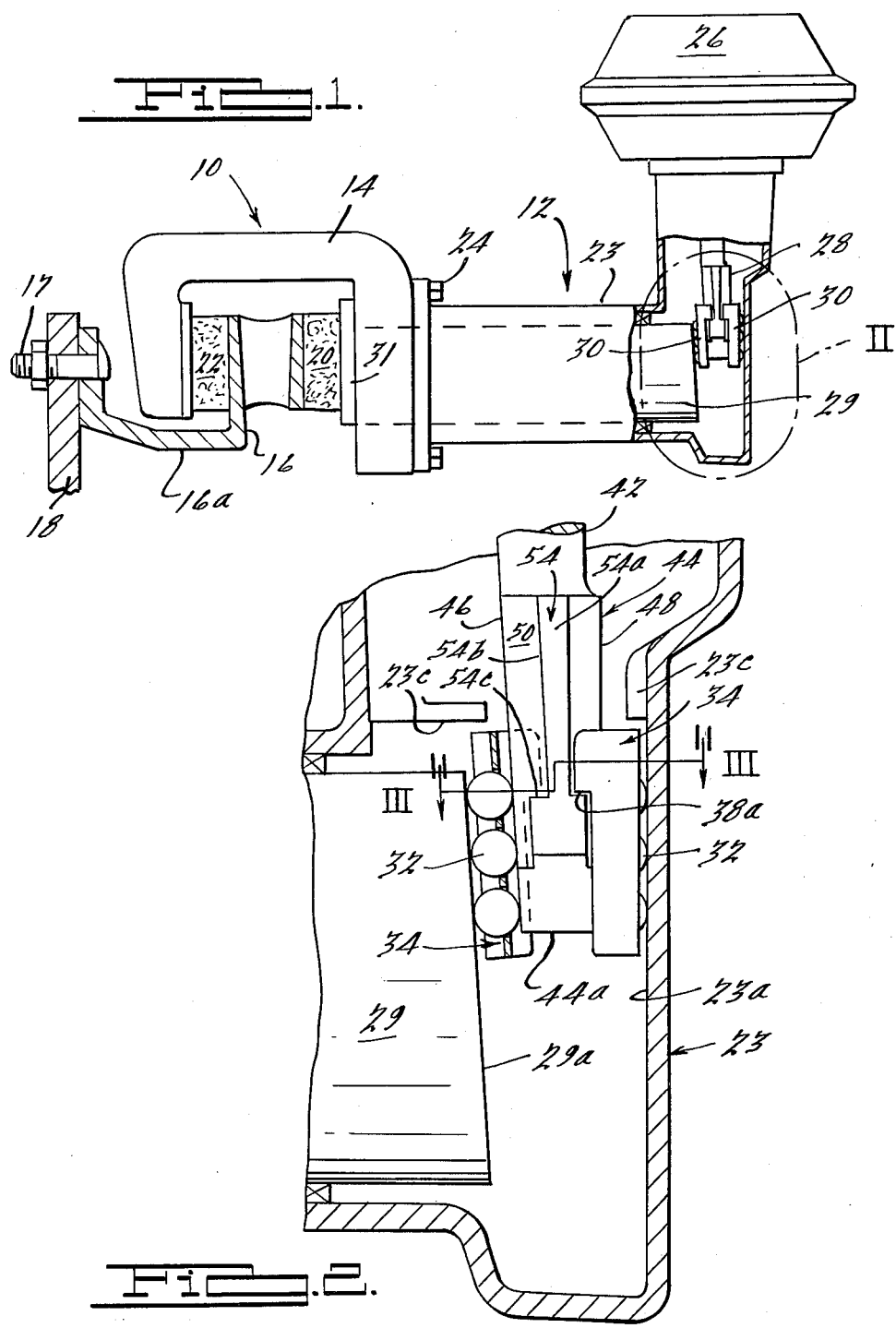

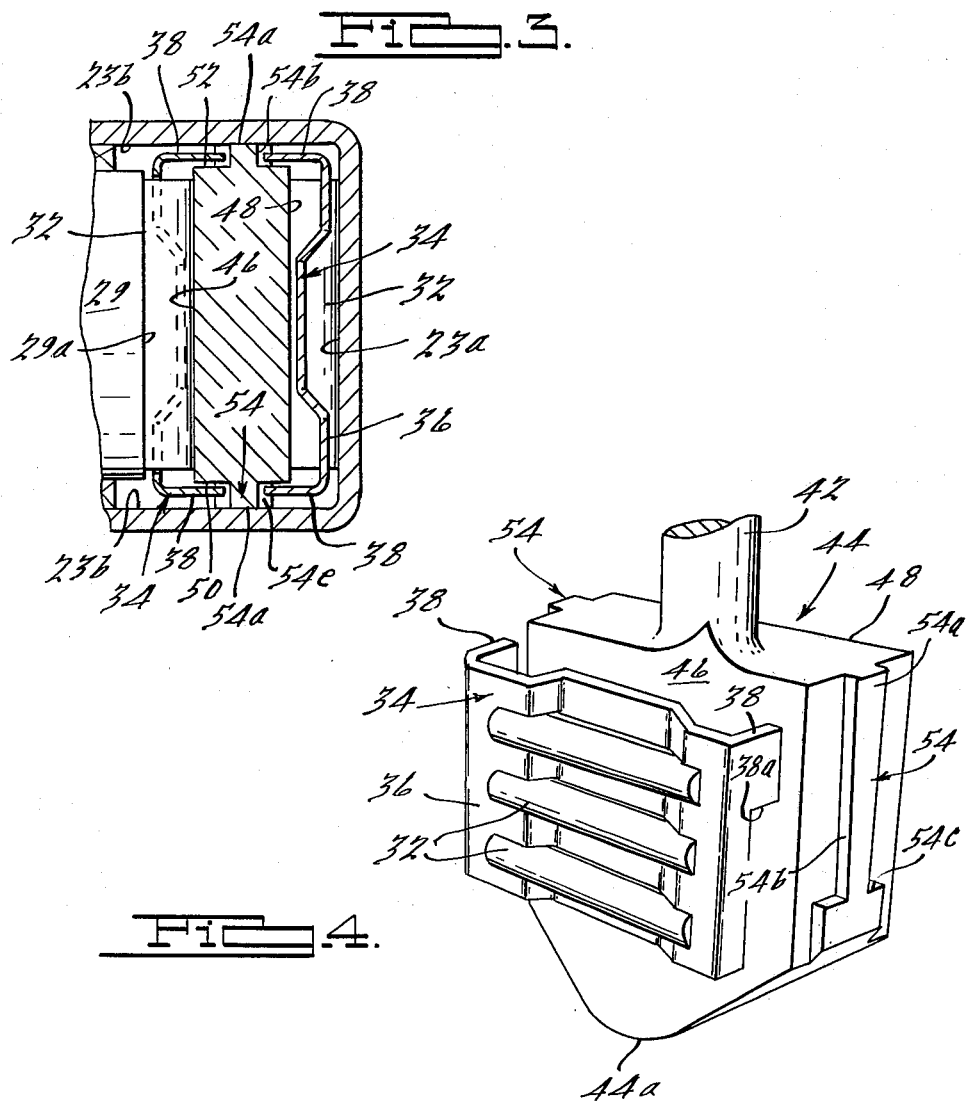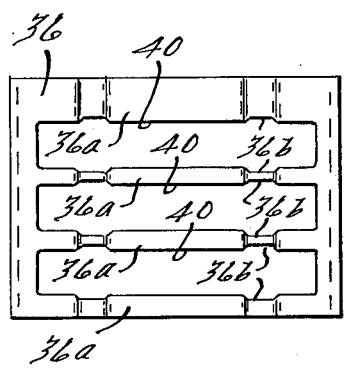

BRAKE ACTUATOR ASSEMBLY

BACKGROUND OF THE INVENTION

This invention relates to an actuator assembly for a vehicle brake. More particularly, this invention relates to an improved bearing assembly for a brake actuator of the wedge type.

Wedge type brake actuators typically apply their braking force through a roller bearing assembly interposed between the wedge member and the tappet or tappets engaging the braking elements. Since the load transferred by such roller bearing assemblies is typically quite large, in the order, for example, of 20 tons in a heavy duty truck application, their design is rather critical. While various roller bearing assemblies have been utilized in the past for this application, none has proven to be entirely satisfactory. Specifically, those assemblies that have performed satisfactorily have done so at the expense of being overly large, overly complex, overly heavy or overly expensive; and those that have satisfied the size, simplicity, weight, and cost criteria have, concomittantly, suffered performance derogation.

SUMMARY OF THE INVENTION

Accordingly, it is an object of the present invention to provide an improved roller bearing assembly specifically designed for use in a wedge type brake actuator.

More specifically, it is an object of the present invention to provide such a roller bearing assembly which is compact, simple, light weight and inexpensive, and which yet provides optimum performance.

The invention roller bearing assembly has particular applicability in a brake actuator assembly of the type including a wedge member mounted for reciprocal brake apply and return movement and a tappet adapted to be wedgingly actuated by the wedge member to apply the vehicle brakes. The invention roller bearing assembly is disposed generally in the space between one wedge face of the wedge member and the adjacent end face of the tappet. According to an important feature of the invention, the roller bearing assembly includes a plurality of relatively small diameter rollers in rolling contact with the wedge face and tappet end face; and a generally U-shaped roller cage which embraces the wedge member and includes a base portion defining a plurality of transverse slots spaced along the line of action of the wedge member and each journally receiving a roller, and end portions which slideably guide on the end faces of the wedge member adjoining the wedge face. A similar bearing assembly is positioned in the space between the other wedge face of the wedge member and the adjacent housing guide surface. The disclosed bearing assembly is simple, compact, lightweight and inexpensive and has been found to walk and guide smoothly and positively along the wedge member while efficiently transmitting the extremely high braking loads to the tappet.

According to another feature of the invention, the wedge member is generally rectangular in transverse cross section with the wedge faces dimensionally greater than the end faces; the wedge member includes a raised rib on each end face extending generally parallel to the line of action of the wedge member and presenting a raised guide surface for sliding coaction with an adjacent housing face to guide the wedge member in its brake apply and return movement; and the end portions of each roller cage guide on the portions of the end faces between the raised ribs and the associated wedge face.

According to another feature of the invention, the ribs on the end face of th wedge member are stepped in the direction of the line of action of the wedge member and the end portions of the roller cages are complementarily stepped so that, in the event that the relative indexing of the bearing assembly and wedge member becomes disturbed, the steps of the ribs may coact with the steps on the roller cage end portions to provide ganged movement of the wedge member and bearing assembly to restore proper indexing. In the disclosed embodiment of the invention, the ribs step toward the wedge faces as measured in the direction of brake apply movement so that the ganged movement, if required, occurs on the return stroke of the wedge member as the wedge member overtakes the roller cage.

Further objects, features, and advantages of the invention will be apparent from the drawings and from the description of the preferred embodiment.

BRIEF DESCRIPTION OF THE DRAWINGS

FIG. 1 is a somewhat schematic, partially fragmentary view of a vehicular brake assembly embodying the invention bearing assembly;

FIG. 2 is a view on an enlarged scale, and partially in section, of the portion of the brake assembly of FIG. 1 within the circle 2;

FIG. 3 is a cross sectional view taken on line 3—3 of FIG. 2;

FIG. 4 is a perspective, somewhat exploded view of the invention bearing assembly and coacting wedge member with only one bearing assembly shown for purposes of simplicity; and FIG. 5 is an elevational view of one of the roller cages of the invention bearing assembly.

DESCRIPTION OF THE PREFERRED EMBODIMENT

The vehicle brake assembly of FIG. 1 includes a caliper disc brake assembly 10 and an associated actuator assembly 12.

Caliper disc brake assembly 10 includes a caliper 14 adapted to be slideably mounted on a fixed portion (e.g., an axle housing) of an associated vehicle, a disc 16 embraced by caliper 14 and having a flange portion 16a secured as by bolts 17 to a wheel 18 of an associated vehicle, and inboard and outboard brake pads 20 and 22.

Actuator assembly 12 includes a generally L-shaped housing 23 secured at one end by bolts 24 to the inboard face of caliper 14, an air motor 26 secured to the other end of housing 23, a wedge member 28 driven by the air motor, and a tappet 29 driven by wedge member 28 through roller bearing assemblies 30. Tappet 29 acts against backing plate 31 of inboard brake pad 20 to press pad 20 against the inboard face of disc 16 and thereafter slide the entire brake mechanism to the right to in turn apply outboard pad 22 against the outboard face of disc 16, whereby to brake wheel 18 of the associated vehicle, all in known manner.

The present invention relates to roller bearing assemblies 30 and particularly to the manner in which assemblies 30 coact with wedge member 28 to actuate the brake assembly. The details of the roller bearing assemblies, and the particular manner in which these assemblies coact with the wedge member, are best seen in FIGS. 2–5.

Each roller bearing assembly 30, boardly considered, includes a plurality of rollers 32 and a roller cage 34. Each roller cage 34 is formed as a generally U-shaped stamping and includes a generally planar base portion 36 and end portions 38 disposed at right angles to base portion 36. A plurality of transversely extending slots 40 are provided in base portion 36. The mid-section of base portion 36 is depressed out of the general plane of that portion to provide a depressed central area including a plurality of depressed sections 36a (FIG. 5). Depressed sections 36a coact with the undepressed outer sections of base portion 36 to retain the rollers 32 in the slots, and cutouts 36b between depressed central sections 36a and the undepressed outer sections of base portion 36 allow the rollers to freely journal in the slots. Roller cage end portions 38 are stepped to provide shoulders or steps 38a.

Wedge member 28 includes a rod portion 42 suitably secured to the piston rod of air motor 26 and a wedge portion 44. Wedge portion 44 has a generally slab configuration with a rounded leading end 44a. Wedge portion 44 has a generally rectangular transverse cross section with opposite flat wedge faces 46 and 48 converging in the direction of brake applying movement of the wedge member, and flat end faces 50 and 52. A raised rib 54 extends along each end face of wedge portion 44 generally parallel to the line of action of the wedge member. Each rib presents a raised guide surface 54a. The longitudinal side edges 54b of each rib 54 are parallel to the adjacent wedge faces of the wedge member so that the side edges of each rib converge in the direction of brake apply movement. Adjacent the leading end of the wedge member, the side edges of each rib step outwardly toward the adjacent wedge faces to provide shoulders or steps 54c.

In the assembled relation of roller assemblies 30 and wedge member 28, as best seen in FIGS. 2, 3, and 4, the two roller bearing assemblies 30 embrace opposite sides of wedge member 28 with rollers 32 rollably engaging wedge faces 46 and 48 and the end portions 38 of each roller cage slideably guiding at their inner faces on the wedge member end faces 50 and 52, and specifically, on the portions of these end faces between the raised ribs and the wedge faces.

When the wedge member and embracing roller assemblies are assembled into the actuator assembly, as seen in FIGS. 1, 2 and 3, one set of rollers 32 rollably engages the angled flat inner end face 29a of tappet 29, the other set of rollers 32 rollingly engages the adjacent inner surface 23a of housing 23, and rib guide surfaces 54a slideably engage the adjacent parallel inner surfaces 23b (FIG. 3) of housing 23.

In the disclosed embodiment, tappet end face 29a is parallel to wedge face 46 and housing inner surface 23a is parallel to wedge face 48. Thus, as wedge member 28 is moved along its line of action in the brake apply direction, tappet 29 is wedgingly moved to the left, as viewed in FIGS. 1 and 2, to apply the brake. As wedge member 28 moves along its line of action, one set of rollers 32 rollably engages wedge face 46 and tappet end face 29a, and the other roller set rollably engages wedge face 48 and housing surface 23a. The roller assemblies therefore move with, but at half the linear speed of, the wedge member. If, over a multiplicity of operating cycles, the rollers remain in pure rolling contact with the wedge member, the relative indexing of the wedge member and bearing assemblies will remain undisturbed. If, however, because of imperfections or manufacturing tolerances in the overall assembly, the relative indexing of the bearing assembly and wedge member becomes disturbed in the sense of allowing the bearing assemblies to advance relative to the wedge as measured in the direction of brake apply movement, the steps 54c on ribs 54 coact with the steps 38a on roller cage end portion 38 upon the return, or brake release, movement of the wedge member to provide ganged movement of the wedge member and bearing assembly to restore the desired relative indexing.

If the relative indexing of the bearing assembly and wedge member becomes disturbed in the sense of allowing the wedge member to advance relative to the bearing assemblies as measured in the direction of brake apply movement, the roller cages, upon return movement of the wedge member, engage integral stops 23c provided in the housing 23 to retard the roller assemblies relative to the wedge member and thereby restore the desired relative indexing.

The invention roller assembly and wedge construction will be seen to provide a simple, compact, lightweight, inexpensive, and yet extremely effective, means of transferring load in a wedge brake actuator assembly.

Although a preferred embodiment of the invention has been disclosed in detail, it will be understood that various modifications and changes may be made in the disclosed embodiment without departing from the scope or spirit of the invention.

What is claimed is:

1. An actuator assembly for a vehicle brake, comprising:
    (A) a wedge member mounted for reciprocal, longitudinal brake apply and return movement along a line of action and having a generally polygonal transverse cross section with opposite flat wedge faces, converging in the direction of brake apply movement, and end faces;
    (B) a tappet mounted for reciprocal brake apply and return movement along a path intersecting said line of action and presenting a flat inner end face spaced from one of said wedge faces; and
    (C) a bearing assembly disposed generally in the space between said tappet end face and said one wedge face and including
        (1) a plurality of rollers in rolling contact with said tappet end face and said one wedge face, and
        (2) a generally U-shaped roller cage embracing said wedge member and including
            (a) a generally planar base portion generally paralleling said one wedge face and defining a plurality of transversely extending slots spaced along said line of action and each journally receiving a respective one of said rollers, so that said roller cage moves with, but at generally half the speed of, said wedge member as the latter moves in the brake apply and return directions, and
            (b) end portions slideably guiding at their inner faces on the end faces of said wedge member adjoining said one wedge face as the bearing assembly moves with but relative to said wedge member.

2. An actuator assembly according to claim 1 wherein said actuator assembly further includes:
    (D) a housing defining a pair of confronting inner faces lying in planes generally parallel to said line of action; and (E) means defining a guide surface extending longitudinally along each end of said wedge member and raised with respect to the associated end face of the wedge member for sliding coaction with said inner housing faces to guide said wedge member in said brake apply and return movement along said line of action while permitting the inner faces of said end portions of said roller cage to guide on the end faces of the wedge member.

3. An actuator assembly according to claim 1 wherein:
(D) said actuator assembly further includes a housing defining a pair of confronting inner faces lying in planes generally parallel to said line of action;
(E) said wedge member is generally rectangular in transverse cross section with said wedge faces dimensionally greater than said end faces;
(F) said wedge member includes a raised rib on each end face extending generally parallel to said line of action and each presenting a raised guide surface for sliding coaction with one of said inner housing faces to guide said wedge member in its brake apply and return movement along said line of action; and
(G) the inner faces of said end portions of said roller cage guide on portions of said end faces between said raised ribs and said one wedge face.

4. An actuator assembly according to claim 3 wherein:
(H) at least one of said ribs, and thereby the longitudinal edge formed by that rib, is stepped in the direction of said line of action and the associated end portion is complementarily stepped so that, in the event that the relative indexing of the bearing assembly and wedge member becomes disturbed, the step of the rib may coact with the step of the associated end portion to provide ganged movement of the wedge member and bearing assembly to restore said indexing.

5. An actuator assembly according to claim 4 wherein:
(I) said rib steps toward said one wedge face as measured in the direction of brake apply movement so that the aforesaid ganged movement, if required, occurs on the return stroke of the wedge member as the wedge member overtakes the roller cage.

6. An actuator assembly according to claim 5 wherein:
(J) said housing defines stop means in the path of return movement of said roller cage so that the return movement of said roller cage is interrupted to restore the relative indexing of said bearing assembly and wedge member in the event that such relative indexing becomes disturbed in the sense opposite to the sense that is corrected by engagement of said steps.

7. An actuator assembly according to claim 6 wherein:
(K) said housing further defines a flat inner guide surface spaced from the other wedge face;
(L) each of said ribs is disposed generally centrally on the associated end face of the wedge member and defines opposite longitudinal edges which each step outwardly in the direction of brake apply movement toward the respective adjacent wedge face;
(M) another bearing assembly, as aforesaid but in mirror position, is disposed generally in the space between said housing guide surface and said other wedge face; and
(N) said housing defines further stop means in the path of return movement of the bearing cage of said other bearing assembly so that said bearing assemblies roll on the opposite wedge faces of said wedge member with the end portions of the roller cages guiding on the portions of the end faces between the centrally raised ribs and the associated wedge face, and the housing stop means and coacting steps functioning to correct disturbances of the relative indexing of the wedge member and bearing assembly occurring in response to repeated apply and return movement along said line of action.

8. An actuator assembly according to claim 7 wherein:
(O) the opposite longitudinal edges defined by each rib converge in the direction of brake apply movement at the same angle of convergence as said wedge faces.

9. In a brake actuator assembly of the type including a housing; a wedge member mounted in said housing for reciprocal brake apply and return movement along a line of action and having a generally rectangular transverse cross section with opposite flat wedge faces converging in the direction of brake apply movement and end faces; a tappet mounted in said housing for reciprocal brake apply and return movement along a path intersecting said line of action and presenting a flat inner end face spaced from one of said wedge faces; and a bearing assembly disposed generally in the space between said tappet end face and said one wedge face; the improvement wherein:
(A) said wedge member has a raised rib extending along each end face generally parallel to said line of action and presenting a raised guide surface slideably guiding on an adjacent surface of said housing; and
(B) said bearing assembly includes
(1) a generally U-shaped roller cage embracing said wedge member with the central base portion of the cage generally paralleling said one wedge face and the inner faces of the end portions of the cage slideably guiding on portions at the end faces of said wedge member between said ribs and said one wedge face, and
(2) a plurality of rollers in rolling contact with said end face and said one wedge face and respectively journalled in a plurality of parallel, transversely extending slots provided in said base portion at locations spaced along said line of action.

* * * * *